US006871003B1

(12) United States Patent
Phillips et al.

(10) Patent No.: US 6,871,003 B1
(45) Date of Patent: Mar. 22, 2005

(54) EDIT DECISION LIST FOR IDENTIFYING THE PULL DOWN PHASE OF A VIDEO SIGNAL

(75) Inventors: Michael E. Phillips, Melrose, MA (US); Katherine H. Cornog, Newburyport, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/528,786

(22) Filed: Mar. 17, 2000

(51) Int. Cl.[7] ................................................ H04N 5/93
(52) U.S. Cl. ........................................ 386/55; 386/65
(58) Field of Search ............................ 386/46, 52, 55, 386/65; 707/102

(56) References Cited

U.S. PATENT DOCUMENTS

| | | | |
|---|---|---|---|
| 4,972,274 A | | 11/1990 | Becker et al. |
| 5,267,351 A | | 11/1993 | Reber et al. |
| 5,568,275 A | * | 10/1996 | Norton et al. ................ 386/52 |
| 5,584,006 A | | 12/1996 | Reber et al. |
| 5,724,605 A | | 3/1998 | Wissner |
| 5,752,029 A | | 5/1998 | Wissner |
| 5,754,851 A | | 5/1998 | Wissner |
| 5,905,841 A | * | 5/1999 | Peters et al. .................. 386/52 |
| 6,016,380 A | * | 1/2000 | Norton ......................... 386/52 |
| 6,061,758 A | | 5/2000 | Reber et al. |
| 6,381,608 B1 | * | 4/2002 | Savoie ........................ 707/102 |
| 6,571,255 B1 | | 5/2003 | Gonsalves et al. |
| 6,636,869 B1 | | 10/2003 | Reber et al. |

OTHER PUBLICATIONS

AAF Specification Version 1.0 DR4, 2000, pp. i–181.
Avid Media Match User's Guide, Version 4.0, Mar. 24, 1993, pp. 1–88.
International Standard ISO/IEC 13818-2, "Information technology—Generic coding of moving pictures and associated audio information: Video", ISO/IEC 2001, Corrected version Aug. 1, 2002, pp. i–19.
Open Media Framework, OMF Interchange Specification, Version 2.0, Nov. 29, 1995, pp. i–245.
SMPTE Standard, ANSI/SMPTE 258M–1993, "for Televison of Edit Decision Lists", Feb. 5, 1993, pp. 1–36.

* cited by examiner

*Primary Examiner*—Huy Nguyen
(74) *Attorney, Agent, or Firm*—Peter J. Gordon

(57) ABSTRACT

The invention provides an editing system for editing and combining media material into a resulting media composition. The media may be film or video based material, and also may include audio material. The video may adhere to either NTSC or PAL timing. In response to editing instructions, an Edit Decision List (EDL) is produced that specifies the material that makes up the edited composition, and the order of presentation of this material in the output composition. The EDL specifies the input clips that are taken from the source material using source timecode and similarly defines the output order again according to a new time code, the record time code. The editing system produces an extended EDL that facilitates the downstream processing (after the editing has been completed) for post production tasks requiring the need to know accurately where edit points occur.

21 Claims, 12 Drawing Sheets

Title: Visual EDL
FCM: Non-Drop Frame

| | | | | |
|---|---|---|---|---|
| 001 055 A C | 06:03:18:27 | 06:03:23:27 | 01:00:00:00 | 01:00:05:00 |

FCM: Non-Drop Frame

| | | | | |
|---|---|---|---|---|
| 002 BL V C | 00:00:00:00 | 00:00:00:00 | 01:00:00:00 | 01:00:00:00 |

FCM: Drop Frame

| | | | | |
|---|---|---|---|---|
| 002 055 V D 015 | 06:46:56:25 | 06:46:57:25 | 01:00:00:00 | 01:00:01:00 |
| 003 055 V C | 06:46:25:03 | 06:46:26:03 | 01:00:01:00 | 01:00:02:00 |
| 004 055 V C | 06:41:55:00 | 06:41:55:15 | 01:00:02:00 | 01:00:02:15 |
| M2 055 000.0 | | | | |

*Freeze Frame

| | | | | |
|---|---|---|---|---|
| 005 055 V C | 06:42:29:00 | 06:42:29:15 | 01:00:02:15 | 01:00:03:00 |
| 006 055 V C | 06:42:12:04 | 06:42:13:05 | 01:00:03:00 | 01:00:04:01 |
| 007 055 V C | 06:03:18:27 | 06:03:19:11 | 01:00:04:01 | 01:00:04:15 |
| 008 055 V C | 06:03:19:11 | 06:03:19:11 | 01:00:04:15 | 01:00:04:15 |

FCM: Non-Drop Frame

| | | | | |
|---|---|---|---|---|
| 008 BL IV W113 015 | 00:00:00:00 | 00:00:00:15 | 01:00:04:15 | 01:00:05:00 |

FIG. 2

| Timecode | Field | Film Frame | Pull Down (1) | Pull Down (2) |
|---|---|---|---|---|
| :00 | 1 | 1 | A1 | A |
| :00 | 2 | 1 | A2 | A |
| :01 | 1 | 2 | A3 | B |
| :01 | 2 | 2 | A4 | B |
| :02 | 1 | 3 | A5 | C |
| :02 | 2 | 3 | A6 | C |
| :03 | 1 | 4 | A7 | D |
| :03 | 2 | 4 | A8 | D |
| :04 | 1 | 5 | A9 | E |
| :04 | 2 | 5 | A10 | E |
| :05 | 1 | 6 | A11 | F |
| :05 | 2 | 6 | A12 | F |
| :06 | 1 | 7 | A13 | G |
| :06 | 2 | 7 | A14 | G |
| :07 | 1 | 8 | A15 | H |
| :07 | 2 | 8 | A16 | H |
| :08 | 1 | 9 | A17 | I |
| :08 | 2 | 9 | A18 | I |
| :09 | 1 | 10 | A19 | J |
| :09 | 2 | 10 | A20 | J |
| :10 | 1 | 11 | A21 | K |
| :10 | 2 | 11 | A22 | K |
| :11 | 1 | 12 | B1 | L |
| :11 | 2 | 12 | B2 | L |
| :12 | 1 | 12 | B3 | L |
| :12 | 2 | 13 | C1 | M |
| :13 | 1 | 13 | C2 | M |
| :13 | 2 | 14 | C3 | N |
| :14 | 1 | 14 | C4 | N |
| :14 | 2 | 15 | C5 | O |
| :14 | 1 | 15 | C6 | O |
| :14 | 2 | 16 | C7 | P |
| :16 | 1 | 16 | C8 | P |
| :16 | 2 | 17 | C9 | Q |
| :17 | 1 | 17 | C10 | Q |
| :17 | 2 | 18 | C11 | R |
| :18 | 1 | 18 | C12 | R |
| :18 | 2 | 19 | C13 | S |
| :19 | 1 | 19 | C14 | S |
| :19 | 2 | 20 | C15 | T |
| :20 | 1 | 20 | C16 | T |
| :20 | 2 | 21 | C17 | U |
| :21 | 1 | 21 | C18 | U |
| :21 | 2 | 22 | C19 | V |
| :22 | 1 | 22 | C20 | V |
| :22 | 2 | 23 | C21 | W |
| :23 | 1 | 23 | C22 | W |
| :23 | 2 | 24 | D1 | X |
| :24 | 1 | 24 | D2 | X |
| :24 | 2 | 24 | D3 | X |

FIG. 3B

Digital Cut EDL

Title: Digital Cut EDL
FCM: Non-Drop Frame

Pulldown EDL

Title: Pulldown EDL
FCM: Non-Drop Frame

| | | | | | | | |
|---|---|---|---|---|---|---|---|
| 001 001 | V | C | 01:00:51:10 | 01:01:12:06 | 01:00:00:00 | 01:00:20:26 | |
| *24P|16:9|16:9 | | | A1.1 | A1.1 | A1.1 | B1.1 | |
| 002 001 | V | C | 01:02:11:09 | 01:02:29:01 | 01:00:20:26 | 01:00:38:18 | |
| *24P|16:9|16:9 | | | D2.1 | D2.1 | B1.1 | C2.1 | |
| 003 001 | V | C | 01:03:23:23 | 01:04:10:24 | 01:00:38:18 | 01:01:25:19 | |
| *24P|16:9|16:9 | | | C2.1 | C2.1 | C2.1 | D2.1 | |
| 004 001 | V | C | 01:04:57:24 | 01:05:26:10 | 01:01:25:19 | 01:01:54:05 | |
| *24P|16:9|16:9 | | | D2.1 | D2.1 | D2.1 | A1.1 | |
| 005 253 | V | C | 02:01:30:24 | 02:02:09:05 | 01:01:54:05 | 01:02:32:16 | |
| *24P|16:9|16:9 | | | D2.1 | D2.1 | A1.1 | B1.1 | |
| 006 253 | V | C | 02:03:07:05 | 02:03:39:02 | 01:02:32:16 | 01:03:04:13 | |
| *24P|16:9|16:9 | | | A1.1 | A1.1 | B1.1 | C2.1 | |
| 007 253 | V | C | 02:04:44:23 | 02:05:16:14 | 01:03:04:13 | 01:03:36:04 | |
| *24P|16:9|16:9 | | | B3.1 | B3.1 | C2.1 | D2.1 | |
| 008 253 | V | C | 02:05:59:08 | 02:06:38:19 | 01:03:36:04 | 01:04:15:15 | |
| *24P|16:9|16:9 | | | C2.1 | C2.1 | D2.1 | A1.1 | |
| 009 252 | V | C | 03:01:21:03 | 03:01:41:24 | 01:04:15:15 | 01:04:36:06 | |
| *24P|16:9|16:9 | | | B3.1 | B3.1 | A1.1 | B1.1 | |
| 010 252 | V | C | 03:02:24:13 | 03:02:44:10 | 01:04:36:06 | 01:04:56:03 | |
| *24P|16:9|16:9 | | | C2.1 | C2.1 | B1.1 | C2.1 | |
| 011 252 | V | C | 03:03:36:25 | 03:04:05:11 | 01:04:56:03 | 01:05:24:19 | |
| *24P|16:9|16:9 | | | A1.1 | A1.1 | C2.1 | D2.1 | |
| 012 252 | V | C | 03:04:50:06 | 03:05:37:07 | 01:05:24:19 | 01:06:11:20 | |
| *24P|16:9|16:9 | | | B1.1 | B1.1 | D2.1 | A1.1 | |
| 013 251 | V | C | 04:06:57:06 | 04:07:36:17 | 01:06:11:20 | 01:06:51:01 | |
| *24P|16:9|16:9 | | | B1.1 | B1.1 | A1.1 | B1.1 | |
| 014 251 | V | C | 04:02:24:18 | 04:04:12:00 | 01:06:51:01 | 01:08:38:13 | |
| *24P|16:9|16:9 | | | B3.1 | B3.1 | B1.1 | C2.1 | |
| 015 251 | V | C | 04:04:58:29 | 04:06:01:10 | 01:08:38:13 | 01:09:40:24 | |
| *24P|16:9|16:9 | | | D2.1 | D2.1 | C2.1 | D2.1 | |
| 016 251 | V | C | 04:06:55:00 | 04:08:07:07 | 01:09:40:24 | 01:10:53:01 | |
| | | | A1.1 | A1.1 | D2.1 | B1.1 | |

*FIG. 7*

Mixed Sources EDL

Title: Mixed
FCM: Non-Drop Frame

| | | | | | | | |
|---|---|---|---|---|---|---|---|
| 001 001 | V | C | 01:00:51:10 | 01:01:12:06 | 01:00:00:00 | 01:00:20:26 | |
| *30i|16:9|16:9 | | | | | | | |
| 002 001 | V | C | 01:02:11:09 | 01:02:29:01 | 01:00:20:26 | 01:00:38:18 | |
| *30i|16:9|16:9 | | | | | | | |
| 003 001 | V | C | 01:03:23:23 | 01:04:10:24 | 01:00:38:18 | 01:01:25:19 | |
| *30i|16:9|16:9 | | | | | | | |
| 004 001 | V | C | 01:04:57:24 | 01:05:26:10 | 01:01:25:19 | 01:01:54:05 | |
| *30i|16:9|16:9 | | | | | | | |
| 005 253 | V | C | 02:01:30:24 | 02:02:09:05 | 01:01:54:05 | 01:02:32:16 | |
| *24P|4:3|1.85 | | | D2.1 | D2.1 | A1.1 | B1.1 | |
| 006 253 | V | C | 02:03:07:05 | 02:03:39:02 | 01:02:32:16 | 01:03:04:13 | |
| *24P|4:3|1.85 | | | A1.1 | A1.1 | B1.1 | C2.1 | |
| 007 253 | V | C | 02:04:44:23 | 02:05:16:14 | 01:03:04:13 | 01:03:36:04 | |
| *24P|4:3|1.85 | | | B3.1 | B3.1 | C2.1 | D2.1 | |
| 008 253 | V | C | 02:05:59:08 | 02:06:38:19 | 01:03:36:04 | 01:04:15:15 | |
| *24P|4:3|1.85 | | | C2.1 | C2.1 | D2.1 | A1.1 | |
| 009 252 | V | C | 03:01:21:03 | 03:01:41:24 | 01:04:15:15 | 01:04:36:06 | |
| *24P|4:3|1.85 | | | B3.1 | B3.1 | A1.1 | B1.1 | |
| 010 252 | V | C | 03:02:24:13 | 03:02:44:10 | 01:04:36:06 | 01:04:56:03 | |
| *30P|4:3|1.85 | | | | | | | |
| 011 252 | V | C | 03:03:36:25 | 03:04:05:11 | 01:04:56:03 | 01:05:24:19 | |
| *30P|4:3|1.85 | | | | | | | |
| 012 252 | V | C | 03:04:50:06 | 03:05:37:07 | 01:05:24:19 | 01:06:11:20 | |
| *30P|4:3|1.85 | | | | | | | |
| 013 251 | V | C | 04:06:57:06 | 04:07:36:17 | 01:06:11:20 | 01:06:51:01 | |
| *24P|4:3|2.35 | | | B1.1 | B1.1 | A1.1 | B1.1 | |
| 014 251 | V | C | 04:02:24:18 | 04:04:12:00 | 01:06:51:01 | 01:08:38:13 | |
| *24P|4:3|2.35 | | | B3.1 | B3.1 | B1.1 | C2.1 | |
| 015 251 | V | C | 04:04:58:29 | 04:06:01:10 | 01:08:38:13 | 01:09:40:24 | |
| *24P|4:3|2.35 | | | D2.1 | D2.1 | C2.1 | D2.1 | |
| 016 251 | V | C | 04:06:55:00 | 04:08:07:07 | 01:09:40:24 | 01:10:53:01 | |
| | | | A1.1 | A1.1 | D2.1 | B1.1 | |

*FIG. 8*

Title: 24 frame sequence

FCM: Non-Drop Frame

| 001 | VT084 | V | C | 04:06:07:22.2 C1 | 04:06:11:23.2 D1 | 01:00:00:00.1 A1 | 01:00:04:01.1 B1 |
|-----|-------|---|---|------------------|------------------|------------------|------------------|
| 002 | VT082 | V | C | 02:25:46:01.1 B1 | 02:25:57:02.2 C1 | 01:00:04:01.1 B1 | 01:00:15:02.2 C1 |
| 003 | VT082 | V | C | 02:27:24:22.2 C1 | 02:27:27:23.2 D1 | 01:00:15:02.2 C1 | 01:00:18:03.2 D1 |
| 004 | VT082 | V | C | 02:26:00:01.1 B1 | 02:26:05:01.1 B1 | 01:00:18:03.2 D1 | 01:00:23:05.1 A1 |
| 005 | VT082 | V | C | 02:27:33:06.1 B1 | 02:27:37:06.1 B1 | 01:00:23:05.1 A1 | 01:00:27:06.1 B1 |
| 006 | VT082 | V | C | 02:26:10:21.1 B1 | 02:26:16:22.2 C2 | 01:00:27:06.1 B1 | 01:00:33:07.2 C1 |
| 007 | VT082 | V | C | 02:01:52:03.2 D1 | 02:01:57:05.1 A1 | 01:00:33:07.2 C1 | 01:00:38:08.2 D1 |
| 008 | VT082 | V | C | 02:29:31:13.2 D1 | 02:29:33:15.1 A1 | 01:00:38:08.2 D1 | 01:00:40:10.1 A1 |
| 009 | VT082 | V | C | 02:03:58:00.1 A1 | 02:04:06:21.1 B1 | 01:00:40:10.1 A1 | 01:00:49:01.1 B1 |

FIG. 9

Title: 24 frame sequence

FCM: Non-Drop Frame

| | | | | | | |
|---|---|---|---|---|---|---|
| 001 | VT084 | V | C | 04:06:07:22.2 C1 | 04:06:11:23.2 D1 | 01:00:00:00.1 A1 01:00:04:01.1 B1 |
| 002 | VT082 | V | C | 02:25:46:01.1 B1 | 02:25:57:02.2 C1 | 01:00:04:01.1 B1 01:00:15:02.2 C1 |
| 003 | VT082 | V | C | 02:27:24:22.2 C1 | 02:27:27:23.2 D1 | 01:00:15:02.2 C1 01:00:18:03.2 D1 |
| 004 | VT082 | V | C | 02:26:00:01.1 B1 | 02:26:05:01.1 B1 | 01:00:18:03.2 D1 01:00:23:05.1 A1 |
| 005 | VT082 | V | C | 02:27:33:06.2 B2 | 02:27:37:06.1 B1 | 01:00:23:05.1 A1 01:00:27:06.1 B1 |
| 006 | VT082 | V | C | 02:26:10:21.1 B1 | 02:26:16:22.2 C2 | 01:00:27:06.1 B1 01:00:33:07.2 C1 |
| 007 | VT082 | V | C | 02:01:52:04.1 D2 | 02:01:57:05.1 A1 | 01:00:33:07.2 C1 01:00:38:08.2 D1 |
| 008 | VT082 | V | C | 02:29:31:13.2 D1 | 02:29:33:15.1 A1 | 01:00:38:08.2 D1 01:00:40:10.1 A1 |
| 009 | VT082 | V | C | 02:03:58:00.1 A1 | 02:04:06:21.1 B1 | 01:00:40:10.1 A1 01:00:49:01.1 B1 |

FIG. 10

EDIT DECISION LIST FOR IDENTIFYING THE PULL DOWN PHASE OF A VIDEO SIGNAL

FIELD OF THE INVENTION

The invention belongs to the field of video and film editing. More particularly, the invention is related to a method and apparatus for identifying the pulldown phase of a video signal, which was derived from a film source, in an edit decision list (EDL) that may include both progressive and interlaced material in order to optimize downstream processing for processes such as compression, color correction and display processing.

BACKGROUND OF THE INVENTION

Completed video and film programs are generally composed of segments from several sources. The programs are typically assembled by an editor who views the sources of material that are available and chooses the segments that will make up the final program. However, the program is not usually edited at the same place or time as the physical production of the final video tape or film; instead, the final production occurs at a facility equipped to produce the high-quality editing that is required for the final product. Therefore, the original editor of the program must generate a set of editing instructions to be used in the construction of the final program, which is commonly automated using computer technology.

A set of editing instructions for video or film programs is often produced in a format called an edit decision list (EDL). A conventional EDL consists of a sequence of editing instructions, each of which is a computer instruction for a computerized edit controller which assembles a final program from source material. An editing instruction represents an event description, where each event is a transition to a new program segment. There are a number of available EDL formats, but each conveys similar information. The event description contains such information as the source of the new program segment, the time codes describing both the portion of the source that will be recorded and its destination in the final program, and the type of edited transition that is to be used from the previous segment. Using the information represented by editing instructions, the final program can be automatically constructed from the several sources of program material.

Because an editor may choose an output media format different from the input format, the EDL must take into account these format changes to precisely identify the transition to a new segment. For example, film is shot at 24 fps (frames per second) progressive; NTSC video is recorded at 30 fps and includes two interlaced fields that represent a single frame. It is to be understood that the use of the term "NTSC video" throughout this description is to mean a video signal, either analog or digital, that adheres to NTSC timing. The PAL format for video, which is extensively used in Europe, is recorded at 25 fps interlaced. Similarly, it is also to be understood that the use of the term "PAL video" throughout this description is to mean a video signal, either analog or digital, that adheres to PAL timing. If film is to be transferred to a NTSC video format, more frames must be added to satisfy the higher frame rate of NTSC video. The addition of these frames is performed in a well known manner described as "pulldown". Each frame from the film is converted to either 2 or 3 fields of video data, and consequently, 24 frames of film are thus converted to 30 frames of NTSC video having 60 fields in the aggregate, or to 25 frames of PAL video having 50 fields. While pulldown resolves the difference in frame rate between film and video, the process complicates the identification of the edit points within a work.

Recently, editing of film at 24 frames progressive has generally become the editing approach of choice for professional film editors. The film is digitized, digitally edited on a Digital Non-Linear Editing (DNLE) system in a frame format and only converted to video after the editor requests video as the desired output format.

In conventional systems the output videotape format is locked to the standard of the source material. In other words, the frames specified in the EDL are the same format as the source material. All the frames adhere to NTSC or PAL frame timing. Conventional systems do not permit the mixing of video formats in the same EDL. This limitation clearly restricts the source material for inclusion into the work, and at best requires that the format of the source be converted to the output format.

It would thus be desirable that the final version of a video production, after the editing, permits a combination of scenes recorded in different formats. The completed video work is thus a combination of different sources transferred to video. This combination includes but is not limited to NTSC video, PAL video, and film converted to NTSC or PAL video by the telecine process.

Often the completed work is digitally encoded using a well-known standard such as MPEG-2 to compress the data for efficient storage or transmission of the work. Because the quality of the compression is dependent upon the original source of the video (i.e. whether the frames were converted from a film source by a telecine or recorded in native video) it is advantageous to identify the original source of each frame and field within the video. Knowing this information, the compression algorithm can more efficiently encode a video frame that was originally recorded on film and converted to video, by eliminating any redundant fields. Therefore it would be advantageous to provide a mechanism to identify the original source material associated with the output video for better compression.

The combination of video segments derived from both native video and film also presents other instances in which it would be beneficial to know the pull down sequence of the video and also the editing points for the video. For example, color correction may be required to provide consistency of color across the different video clips. Therefore, it would be advantageous to know the scene changes in the film and the corresponding video fields in order to identify the fields to correct.

SUMMARY OF THE INVENTION

In one aspect, the invention provides an editing system for editing and combining media material into a resulting media composition. The media may be film or video based material, and also may include audio material. The video may adhere to either NTSC or PAL timing. In response to editing instructions, an Edit Decision List (EDL) is produced that specifies the material that makes up the edited composition, and the order of presentation of this material in the output composition. The EDL specifies the input clips that are taken from the source material using source timecode and similarly defines the output order again according to a new time code, the record time code.

In a further aspect of the invention, the editing system produces an extended EDL that facilitates the downstream processing (after the editing has been completed) for post production tasks requiring the need to know accurately where edit points occur.

In one aspect of the invention, the editing process produces an extended EDL that identifies scene changes in the output composition. In this practice of the invention, the scene change is identified in the EDL by a comment statement specifying the timecode and pulldown sequence of the associated video, but other techniques are considered to be within the scope of the invention. Advantageously, this aspect of the invention permits an efficient manner of identifying the frames of the output composition that originated from a common source and thus should be processed as a group by a downstream process such as color correction. The color correction may be required due to light differences due to a camera angle change, or a change from natural to artificial light.

In a further aspect of the invention, the editing process produces an extended EDL that identifies the video clips or segments that comprise the output composition. In this practice of the invention, the individual video clips represent different cut points in the output composition. The different video clips may be encoded as video adhering to NTSC or PAL timing with film converted to video by a telecine. In this aspect of the invention, video clips resulting from a frame rate converting pulldown may be combined with native recorded video.

In a yet further aspect of the invention, an extended EDL is generated that identifies the cut points in a video composition. Each cut point in the video composition corresponds to an edit operation that was performed on a digital frame representative of a film frame shot at 24 frames per second. In this aspect of the invention, for video generated by a pulldown process such as results from the application of a telecine, the pulldown sequence of the video segment is specified by identifying the pulldown sequence of the starting and ending fields of the video cut.

In yet a still further aspect of the invention, the pulldown sequence of the output video is specified in an extended EDL by identifying the pulldown phase of the starting and ending fields of each video clip comprising the output composition. In addition to identifying the specific starting and ending pulldown phase for each video clip, the fields are also identified as the odd or even field in the video frame.

In another aspect of the invention, an extended EDL is generated that identifies the selected portions of video clips that make up a composition by specifying the starting and ending fields of each selected portion, which are selected to maintain a consistent pulldown cadence, appropriate with either the NTSC or PAL timing.

In a still further aspect of the invention, an extended EDL conveys the aspect ratio of the input medium and the aspect ratio of the content/program.

In another aspect of the invention, the digital video fields identified in an extended EDL according to the invention are compressed. The compression may in one practice of the invention be performed in compliance with the MPEG-2 standard for compression.

In another aspect of the invention, an extended EDL consists of information specifying the source material from which the different video clips originated. This source material may be film shot at 24 frames per second and converted to either NTSC or PAL video timing by a telecine, or recorded video, which adheres to either NTSC or PAL timing. In this aspect of the invention, compression may be performed on the digital fields corresponding to the video, and the compression techniques utilized are responsive to the source material from which the different video clips originated. In this aspect of the invention, the compression is preferably performed according to the MPEG-2 standard.

BRIEF DESCRIPTION OF THE DRAWING

For a better understanding of the present invention, together with other and further objects, advantages and capabilities thereof, reference is made to the accompanying drawings, in which:

FIG. 2 is a conventional edit decision list;

FIG. 3B is a representation of the PAL pulldown process performed by a telecine;

FIG. 6 depicts an extended EDL identifying the digital cuts, in accordance with the invention.

FIG. 7 depicts an example of a pulldown EDL.

FIG. 8 depicts an example of a mixed source EDL.

FIG. 9 depicts an extended EDL having timecodes that are adjusted to show the beginning of the first field of the film frame, which is the image that was used in an edit.

FIG. 10 depicts an extended EDL that maintains 2:3 pulldown from the source material to the output material; and

DETAILED DESCRIPTION

Figure 1A:
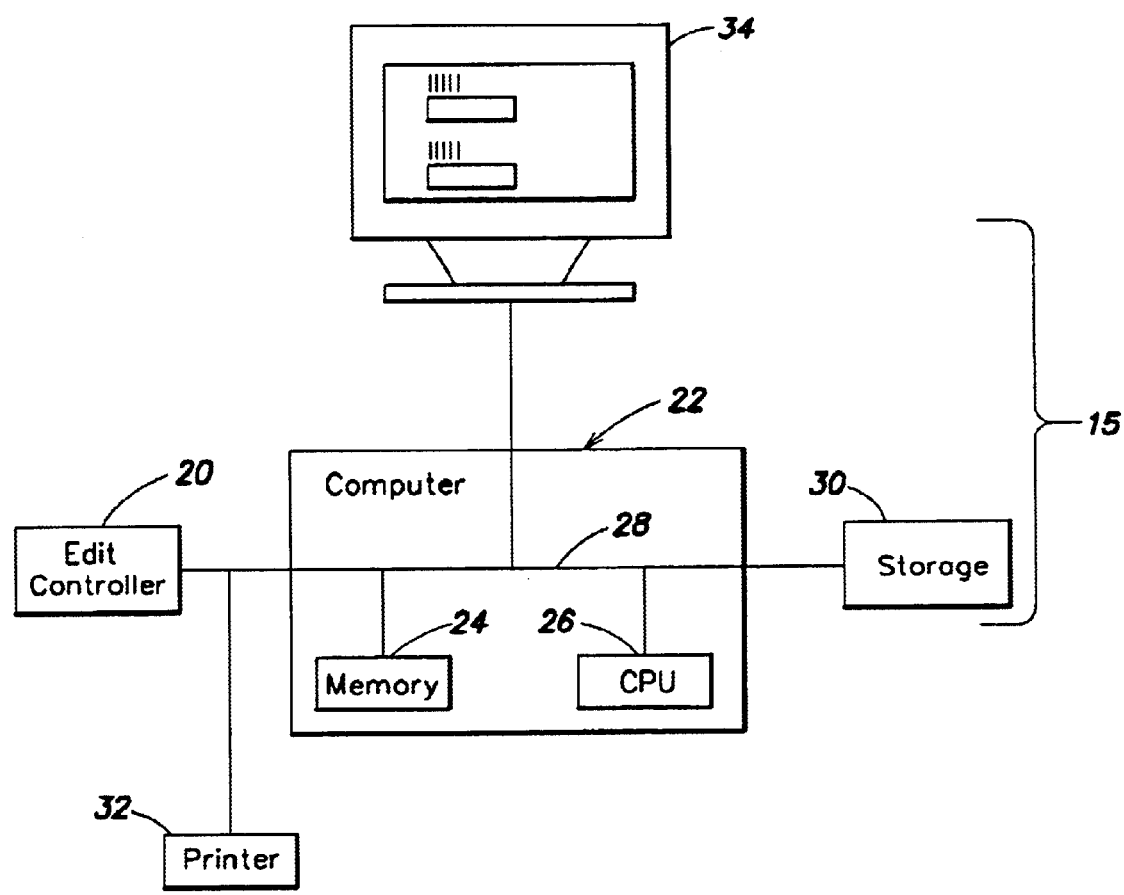
FIG. 1A is a block diagram of a computer system suitable for use with the present invention.

A conventional edit decision list (EDL) is a series of computer instructions for an edit controller 20 (FIG. 1) which produces an edited video or film program from a combination of source materials. The EDL is a list of editing instructions, each of which represents one segment of the program. Each editing instruction indicates the source of that segment (e.g., the name of the video tape or film on which it is recorded) and the portion of the source, indicated by start and stop times, that makes up the segment. Edit decision lists are commonly generated using a computerized editing system 15 such as shown in FIG. 1A. Such a system 15 commonly includes a computer 22 with a volatile, typically random-access, memory 24 connected to a central processing unit (CPU) 26 via a bus 28. Conventional computer systems, as well as those specially designed for video editing, may be used as the system 15 for the purpose of editing. More conventional computer systems may also include a printer 32 and non-volatile memory or storage 30, such as a hard disk or optical disk. The computer system 15 may be connected to an edit controller 20 to provide it with an EDL from which an output video program is generated. The computer system 15 may also include a video display 34.

Figure 1B:
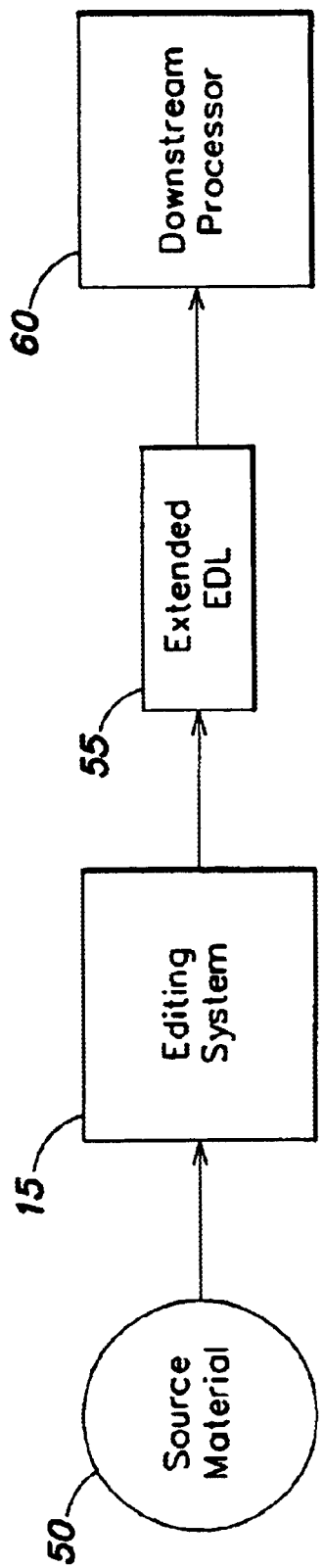
FIG. 1B is a block diagram of communication between an editing system and a downstream processor using an extended EDL, according to the invention.

FIG. 1B shows in schematic form an object of the present invention. Source material 50 such as film or videotape is edited on an editing system 15 to produce an extended EDL 55 that describes an edited output composition. Extended EDL 55 is input to a downstream processor 60 in order to perform post editing processing on the downstream processor 60. The extended EDL 55 permits communication of metadata from the editing system 15 to the downstream processor 60 to provide for more efficient downstream processing.

FIG. 2 shows a conventional EDL 200 as it could appear on a computer display or as printed. It should be noted that the particular EDL format used is not important for the invention, which is applicable to edit instructions generally. One of ordinary skill in the art will recognize that other EDL formats are satisfactory to practice the invention, and the invention is not limited to the format disclosed. This illustrative EDL is composed of eight editing instructions. Track type 210 is an indicator of whether the content is audio or video. In this EDL 200, one of the instructions describes the audio (A) portion of the program and the other seven instructions describe the segments of the video (V) portion. Each instruction, whether audio or video, indicates the origin of that segment by source 220 and by source start time 230 and source stop time 240 of the segment. Similarly, destination start time 250 and destination stop time 260 indicate where that segment is to be recorded on the final program. Finally, transition type label 270 describes the type of transition (wipe, dissolve, etc.) that is to be used in moving to the segment described in the current editing instruction from the previous program segment.

To take a particular example of the EDL format, consider the third entry in the list which is identified by reference number 215. Since the track type 210 for this element is "V", this entry is a video segment. It is found on the tape or film labeled "005" from time code 06:46:25:03 to time code 06:46:26:03. Therefore, it is one minute long, and it is to be recorded from time code 01:00:01:00 to time code 01:00:02:00 on the "RECORD" tape or film. The edit transition from the previous segment to this one on the final tape is to be a "cut", indicated by a "C" in transition-type 270.

In a typical editing operation for film, the film is first converted by a telecine machine to a video format before it is digitized. The film frames are converted to video frames, which have two fields per frame. The transfer from film to tape is complicated by the fact that film and video play at different rates. While film is recorded at 24 frames per second (fps), NTSC video is recorded at 29.97 frames per second (fps). PAL video is recorded at 25 fps and also has two fields for each frame.

If film is shot at the standard rate of 24 fps and then directly converted to video frames, the difference between the film and video play rates is large and unacceptable for the NTSC format. The film speed must be adjusted to accommodate the fractional videotape speed of 29.97 fps for NTSC video, and some film frames must be duplicated during the transfer so that both the film and NTSC video have the same duration.

When 24 fps film is transferred to 29.97 fps NTSC videotape, the telecine process must slow down the film by 0.1% of the normal film speed to 23.976 fps. When the transfer to video tape is made by the telecine, the tape runs at 29.97 fps. The telecine process adds additional fields to the output as the film is transferred to tape. A corresponding one second of video includes six frames more than the one second of the recorded film.

Each NTSC video frame generated by the telecine process is actually a composite of two video fields, an odd field, which is a scan of the odd lines on a video screen, and an even field, which is a scan of the even lines on a video screen. A video field consists of 262½ scan lines or passes of an electronic beam across a video screen. To create a full video frame comprised of 525 scan lines, an odd field or scan of the odd lines, is followed by an even field or scan of the even lines. Thus, when an additional video frame is generated and added by the telecine, duplicate video fields are created. During play of the resulting tape, each of the two video fields for the frame are interlaced to make a single frame by scanning of the odd lines (field one) followed by scanning the even lines (field two) to create the frame of video.

Figure 3A:
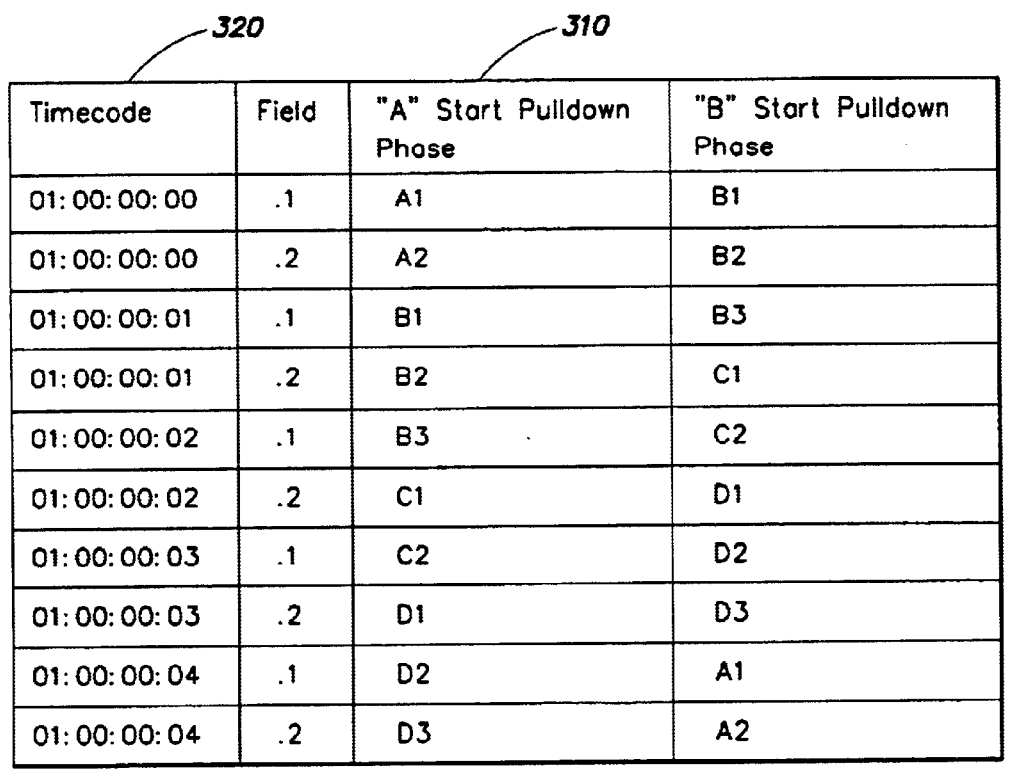
FIG. 3A is a representation of the NTSC pulldown process performed by a telecine.

There are two commonly known techniques for creating duplicate video fields in the telecine process. These techniques are known as "2-3 pulldown" and "3-2 pulldown". The result of a 2-3 pulldown is depicted in FIG. 3A. In a film transfer using 2-3 pulldown, the first frame (the A frame in FIG. 3) is transferred to two video fields, designated in column 310 as A1 and A2, each having a common time code as shown in column 320. The next film frame, the B frame, is transferred to three video fields designated in column 310 as B1, B2, and B3. The B1 field is the odd field that was scanned and the B2 frame is the even field that was scanned. The initial B1 and B2 fields have a common time code as shown in column 320. The B3 field, which is identical to B1, has a higher time code than the B1 field, and is included as the first field in the third frame. The next frame, the C frame, is transferred to two video fields C1 and C2. This process continues with each alternate frame generating three fields rather than two. The 2-3 pulldown is also referred to as a SMPTE-A transfer.

In a 3-2 pulldown transfer process, the cadence of duplication is reversed; the first frame, the B frame, is mapped to three fields, and the second frame, the C frame, is mapped to two fields. Again the process is continued with each alternate frame being mapped into three fields. This process is known as a SMPTE-B transfer. The difference between a SMPTE-A and SMPTE-B transfer is the number of fields generated by the first frame. In either case, four frames of film are converted into ten video fields or five frames of video.

When a 2-3 pulldown sequence is used, an A, B, C, D sequence of frames in the original film footage creates an A1A2, B1B2, B3C1, C2D1, D2D3 sequence of frames on the videotape. A 3-2 pulldown produces a B1B2, B3C1, C2D1, D2D3, A1A2 sequence of frames. As was previously described, the telecine slows down the film before the frame transfer and duplication process, so that the film frame rate is 23.976 fps.

Film, recorded at 24 fps, can also be converted to the PAL video format by a telecine. However, in this case, the 24 frames of film must be converted to 25 frames of PAL video having two fields for each frame. A pulldown process similar to that used to convert film to NTSC video is employed. This is referred to as "PAL Pulldown" or a 24+1 compensated transfer. FIG. 3B shows the relationship of this type of transfer with both the standard pulldown definition having a repeating pattern of A, B, C, and D where A, B, C, and D have the same definition as in a NTSC transfer:

"A"=2 fields with no timecode change between fields
"B"=3 fields with timecode change between fields 2 and 3
"C"=2 fields with timecode change between fields
"D"=3 fields with timecode change between fields 1 and 2

For PAL video, the first 11 film frames are converted to 22 fields of video where each film frame is converted to a video frame, having two fields. The twelfth film frame is converted to a video frame having 3 fields. Film frames 13–23 are then converted to 22 video where each film frame is again converted to a PAL video frame, having two fields. The twenty-fourth film is converted to a PAL video frame having 3 fields. As a result of this process, the 24 film frames are converted to 25 PAL video frames having 50 fields in the aggregate. When film is transferred to video at a framerate of 25 fps rather than the usual 24 fps, there is no pulldown relationship between film and video as there is a 1:1 correlation between the film frame and the video frame. Every frame of film consists of two fields.

It is preferable that during the telecine conversion, a log called a Film Transfer Log (FTL) is created that records the correspondence between the film frames and the video frames and pulldown phase. The FTL documents the relationship between the videotape fields and the corresponding raw film footage used to create that tape, using so-called sync points. A sync point is a distinctive frame located at the beginning of a section of film, say, a clip or scene which has been transferred to tape. A sync point documents the type of pulldown used to generate the video, and which of the A, B, C, or D frames corresponds to the sync point frame.

Having described in general the pulldown process for a film to videotape transfer for both NTSC and PAL video, the process for editing film on an editing machine using pulldown will now be described. The process will be described in terms of NTSC video, but those of ordinary skill in the art will recognize that video created with a "24+1" compensated transfer is handled in an analogous manner.

Figure 4:
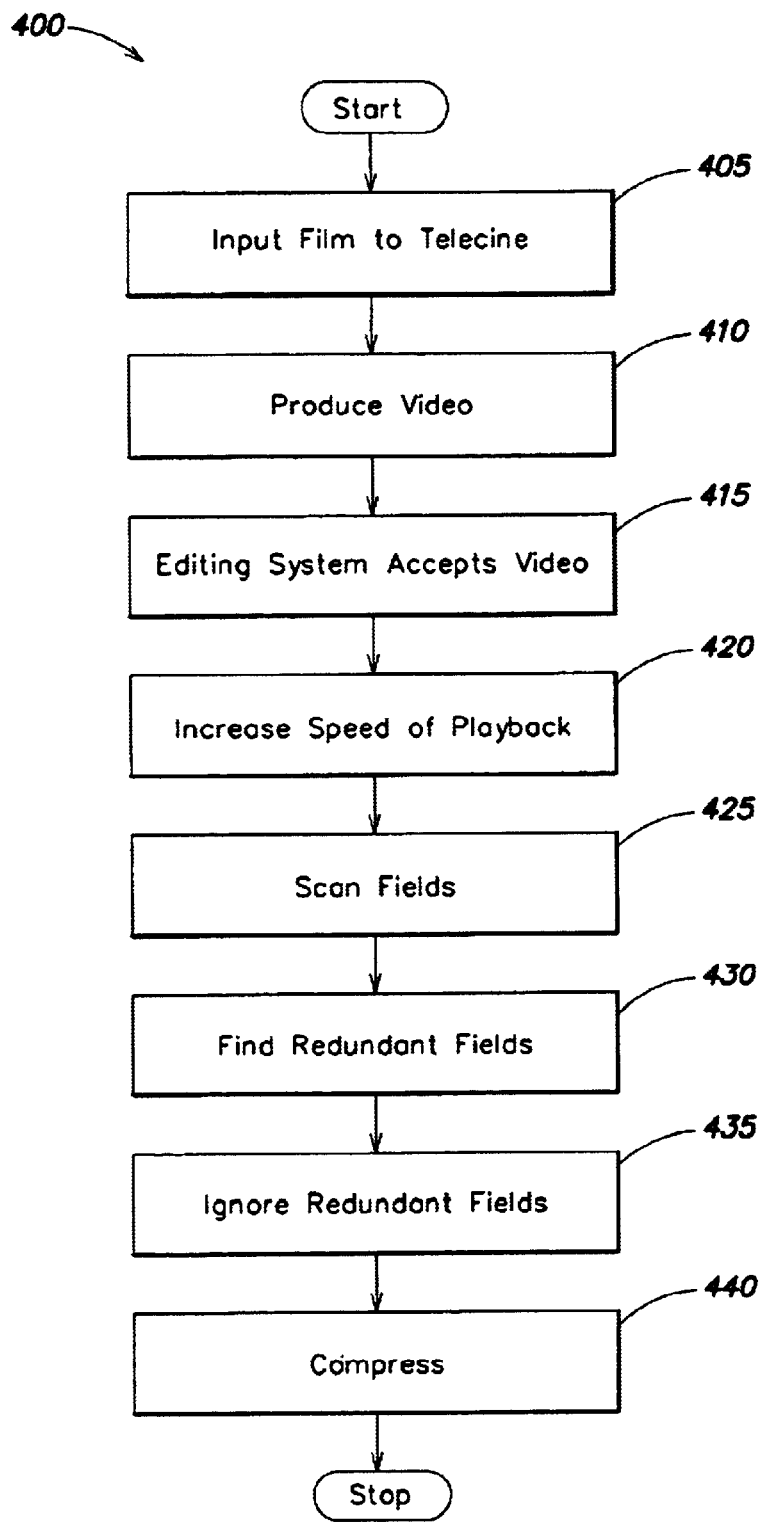
FIG. 4 is flow chart showing depicting the editing process.

An example of such an editing machine is the Avid Symphony Universal from Avid Technology, Inc. of Tewksbury, Mass. Referring to FIG. 4, there is shown a flow chart 400 of the process by which film, originally shot at 24 frames per second is edited in the 24 frames progressive mode, before recording to the final output media. In the 24 frame per second progressive mode, the redundant fields generated by the telecine process are eliminated and the resulting digital content is the composite of odd and even fields from the video. Thus the editing is done on a 24 frame basis rather than the 30 frame basis of video.

In step 405, film is input to a telecine. In step 410 the telecine produces either a NTSC or PAL standard video from the film source. Both of these formats are well known to those of ordinary skill in the art, and thus there is no need to describe these formats in detail. In the case of NTSC video, additional frames are included in the output to change the nominal display rate from 24 fps to approximately 30 fps (actually 29.97 fps). The present invention will be described with reference to the NTSC video format for illustrative purposes, but it will be readily apparent to those of ordinary skill in the art that the invention also applies to the generation of an EDL for an output in the PAL video format, and still further applies most generally to combinations of different video formats in the same composition.

The electronic editing system of the invention accepts in step 415 a videotape produced by the telecine process and a stored FTL, which, for example, might be a FTL stored on a floppy disk. When the FTL data is entered into the system, the system creates a corresponding bin in memory, stored on the system disc in analogy to a film bin in which film clips are stored for editing. The electronic bin contains all fields necessary for film editing, all comments, and all descriptions. The particulars of the bin are displayed for the user on one of the system's display devices. The "Start" and "End" columns of the bin correspond to the videotape Time Code In and videotape Time Code Out columns of the FTL. The "KN Start" and "KN End" columns of the bin correspond to the Keyin and Keyout columns (KeyKode™) of the FTL. During an editing session, the bin keeps track of the editing changes in both the video time-base and the film footage-base. Thus, the bin provides the film editor with the flexibility of keeping track of edits in either of the metrics.

The electronic editing system of the invention, reformats the signal so that the formatted video signal corresponds to film speed, rather than videotape speed. In this reformatting process, the speed of the video from the videotape is increased from 29.97 fps to 30 fps, as shown in step 420. Then the fields of the video are scanned by the system, step 425, and based on the pulldown sequence and pulldown mode specified for each scene by the bin, the redundant video fields added by the telecine process are found 430, and then ignored, step 435, while the other, nonredundant, fields are digitized and compressed into digital frames corresponding to a digital representation of a film frame, step 440. The original film frame sequence is thus reconstructed from the video frame sequence. Thus, this process removes from the video the additional 6 frames added by the telecine process for each second of film time, and stores a digitized representation of the original film frame. The process may be performed for either the 2-3 or 3-2 pulldown scheme because the bin specifies the information necessary to distinguish between the two schemes, and the starting frame (i.e., A, B, C, or D) of either sequence is known for each scene. At the completion of this digitization process, the editing system has a digital representation of the source film in film format, i.e., 24 fps, and has created a bin with both film footage and video timecode information corresponding to the digital representation, so that electronic editing in either time-base or footage-base may begin. The reformatting process allows users to provide the editing system with NTSC or PAL video, and permits the video to be edited as if it were film, i.e., running at film speed.

An Extended EDL

It has been found desirable to pass from the editing system metadata to a downstream processor. In order to pass through this metadata, it is necessary to add this at the time of logging since it is not automatically detected by any other means. Consequently, an extended EDL is defined that permits communication of metadata between an editing system and a downstream processor.

Syntax of an Extended EDL

According to the present invention, an extended EDL is defined that specifies additional information over what a conventional EDL includes. In general, an extended EDL contains metadata about how the source material has been transferred to video. This may include source frame rate, aspect ratio information, pulldown phase, and whether the source is interlaced or progressive material. The extended EDL also includes a description of the edit points with field accuracy when appropriate.

The extended EDL may include a video field indicator that identifies whether the operation called for in the EDL applies to the first or second field of the frame. This video field indicator may be specified in the EDL according to a format defined by SMPTE (Society of Motion Picture and Television Engineers) or as a comment statement in the EDL. SMPTE has defined field based edits in a standard machine readable EDL as hhPmmPssQff, where P is normally a colon:

Q reveals the drop frame flag and edit field (field dominance):

| period | . | non drop, field 1 |
| colon | : | nondrop, field 2 |
| comma | , | drop, field 1 |
| semicolon | ; | drop, field 2 |

Field based edits are described in section 8 of the SMPTE standard S258M, which is incorporated by reference herein.

A comment in a conventional EDL is not acted upon by the editing system, and thus may be used to identify additional information without requiring changes to the general syntax and structure of an EDL. Conventionally, a comment is identified by an "*" at the beginning of an instruction. In one practice of the invention, the video field of interest is identified by appending a "0.1" or "0.2" to the timecode, indicating the first or second field of the frame. The extended EDL of the invention may also include the pulldown phase, if any, of the video segments identified by the timecodes. The pulldown phase of a frame identifies the field of interest within the pulldown sequence. As previously described, the field may be identified as an A1, A2, B1, B2, B3, C1, C2, D1, D2, or D3 type field for NTSC, and as identified in FIG. 3B for PAL.

In addition, the extended EDL identifies whether the source material for the resulting video was derived from a progressive or interlaced source, and the frame rate of the source. Sample values might include 24 p for 24 fps progressive material such as film and 25 i (25 frames per second interlaced) or 30 i for interlaced material such as video adhering to PAL or NTSC timing. The frame rate is descriptive of the film to tape transfer rate to the video. The video streams can be for example either 525 NTSC or 625 PAL. These frame rates are 30 and 25 frames per second respectively and as in the case of ITU-601R are also interlaced. Film can be transferred at a variety of rates within each of these video signals. An example of this would be film recorded at 24 fps which is transferred to NTSC video (23.976 fps) with a 2:3 pulldown or at 29.97 fps. One of ordinary skill in the art will recognize that the framerate parameter in an extended EDL may take on many different values depending on the source material and the speed of recording, and is not limited to the examples shown herein.

Figure 5:
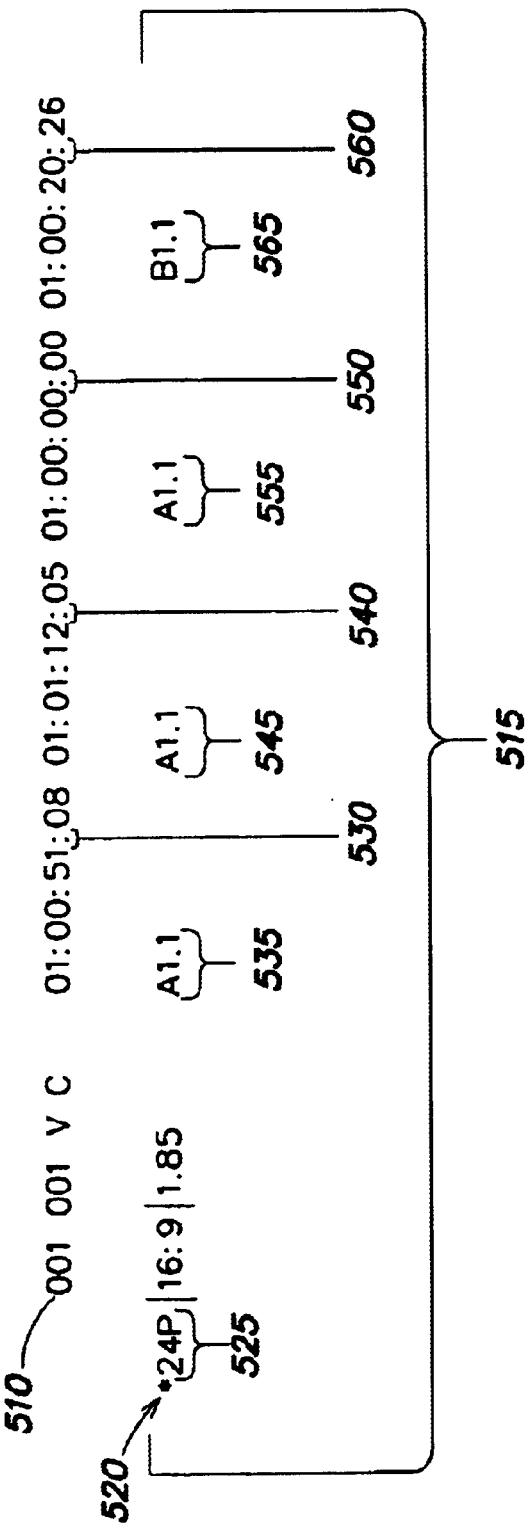
FIG. 5 depicts the syntax of an extended EDL, in accordance with the invention.

FIG. 5 shows an example of an entry in an extended EDL 500, according to the invention. EDL 500 depicts at reference number 510 an EDL entry that specifies one segment of the output composition. The EDL in this case is in the SMPTE format. A video segment starting at the first field of the frame having timecode 01:00:51:10 and including all the frames up to, but not including, the first field of the frame with timecode 01:01:12:06 is to be transferred to the output composition, occupying timecodes 01:00:00:00 to 01:00:20:26. The "0.1" appended to the timecode value references the first field of the frame identified by the timecode value. Extended EDL 500 includes a comment statement 515 identifying additional information that is not included in a conventional EDL. The comment statement is identified by asterisk 520, "*", at the beginning of the statement. The source material is 24 fps progressive as indicated by the 24 P indicator 525, and the timecodes indicate the pulldown phase. As shown, the transfer starts at the first field 530 of a A frame 535 having timecode 01:00:51:10 and continues up to but not including the first field 540 of the frame having time 01:01:12:06, which is an A frame 545 in the pulldown sequence. The video segment is transferred to the output composition starting as the first field 550 of an A frame 555 having timecode 01:00:00:00 up to, but not including, the first field 560 of a B frame 565.

Extended EDL 500 is coded in free form, and can be parsed by a downstream processor according to the known syntax of the extended EDL. EDL 500 is but one example of an extended EDL and those of ordinary skill in the art will recognize that other syntaxes may be contemplated without departing from the spirit of the current invention. Alternatively, the pulldown phase, the field precision on timecode for segment start and end, and aspect ratio information may be carried in a data file such as an Open Media Framework (OMF) or Advanced Authoring Format (AAF) composition. The OMF and AAF file structures are well known to those of ordinary skill in the art and will not be described here. The syntax of extended EDL 500 is presently preferred since the syntax of the additional information will not interfere with editing systems that do not incorporate the present invention, and thus can be implemented without requiring an upgrade to these systems.

In a further embodiment of the invention, the aspect ratios of the video signal and the source content may be carried in an extended EDL. The aspect ratio specifies the ratio of the width to the height of an image. In an extended EDL, a first aspect ratio describes the ratio of the width to height of the digitized video image. Typical values are 16:9 and 4:3. A second aspect ratio describes the ratio of the width to height of the original image that was transferred to video. Typical film aspect ratios are 2.35:1, 1.85:1, and 1.65:1. A single number usually describes film aspect ratios where the second number is assumed to be 1. An example of an entry in an extended EDL specifying the aspect ratio of the source and content is shown in FIG. 11, where 24 P is the frame rate of the source transfer, 4:3 is the source aspect ratio, and 2.35:1 is the content aspect ratio. Aspect ratio parameters need to describe both the aspect ratio of the digitized signal: (4:3 or 16:9) as well as the aspect ratio of the original content in the case of film transferred to video. For example, a 2.35 aspect ratio can be transferred to either 16:9 anamorphic or 4:3. In either case, the matrix of active picture will be different.

While the framerate, aspect ratio of the source and content, the pulldown sequence, and the field designator have been identified as metadata in one example of an extended EDL, an extended EDL is not so limited to only these indicators, but may include any other indicators that are of interest to a downstream processor. In its broadest aspect, the present invention contemplates communicating any metadata of interest to a downstream processor through the extended EDL.

Digital Cut EDL

In one embodiment of the invention, film is edited digitally in 24 fps progressive mode using the techniques described previously. The edited composition is converted to a videotape format for playback, using a pulldown process. For conversion to NTSC video timing, a 2:3 or 3:2 pulldown is used; for conversion to PAL video timing, "24+1" compensated transfer is used. The pulldown process produces a 30 fps framerate for NTSC video and a 25 fps framerate for PAL video for those frames which were edited at film speed. As was earlier described, each video frame consists of both an odd and even field, and the increase in frame frequency requires that redundant fields be added to the output videotape. In this practice of the invention, the finished videotape is the product of the pulldown process applied to the digital representation of the film. This process is commonly referred to as a "digital cut and print to tape".

Figure 6:
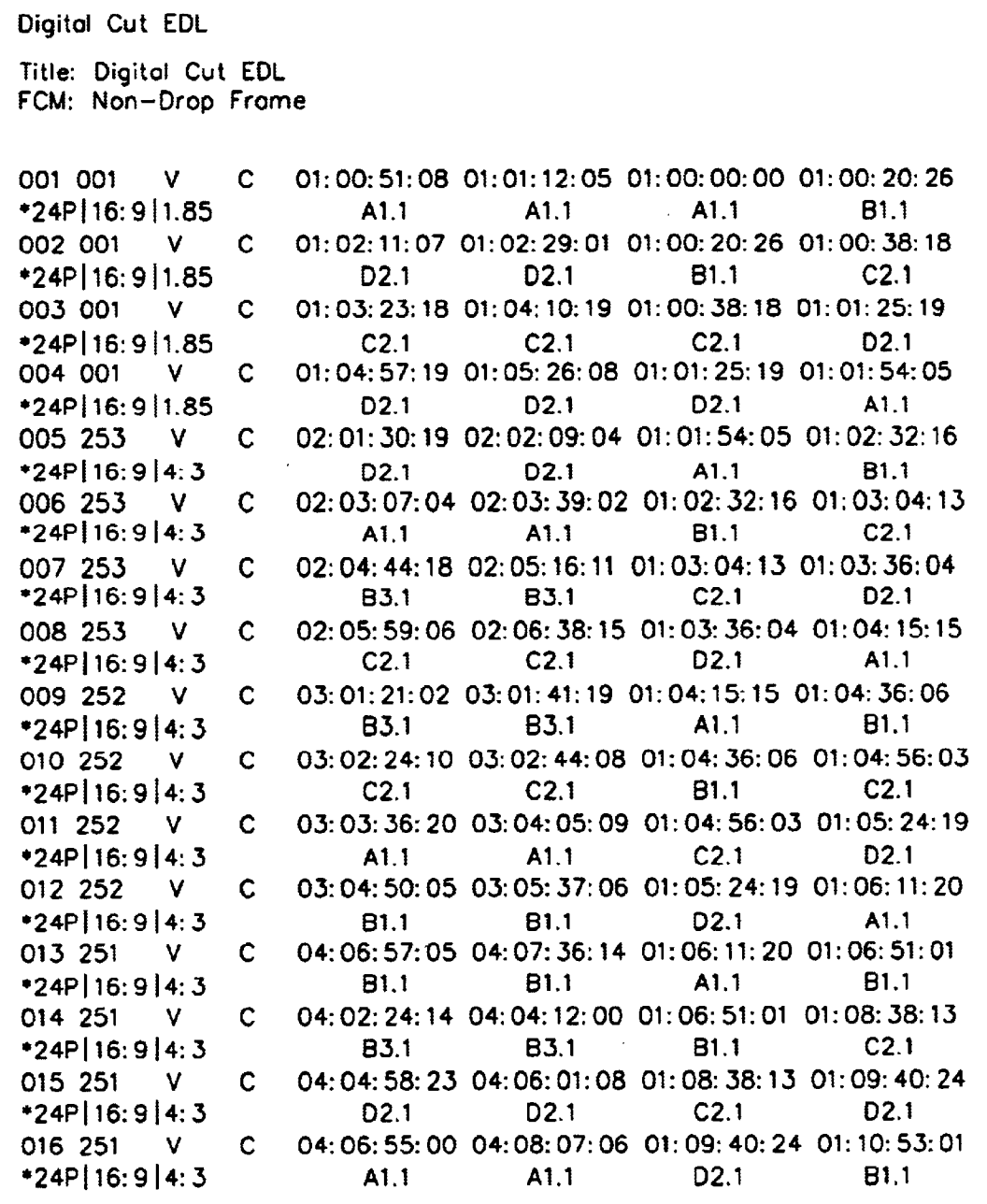

In this embodiment of the invention, the editing function is performed on the digital frames in 24 fps progressive mode and after the editing is performed the resulting digital frames are converted into either NTSC or PAL video. An extended EDL is generated that identifies the digital cuts made on the editing system, and thus this EDL is referred to as a "Digital Cut EDL". These digital cuts correspond to the scene changes in the output videotape. In this case, all the cuts or scene changes are constrained to progressive film frame boundaries since the editing occurred in progressive mode. The EDL shows both field 1 and field 2 cuts because film frame boundaries can fall on either field 1 or field 2 after the pulldown processing associated with the production of the videotape. FIG. 6 depicts the extended EDL identifying the digital cuts, according to the invention.

As shown in FIG. 6, the timecodes of the extended EDL have been augmented by adding either a "0.1" or "0.2" indicator at the end to identify whether the first or second field is the start of the original progressive frame, and also includes a pulldown phase indicator, as previously described and shown in FIG. 5, indicating for each starting and ending timecode where in the pulldown sequence the frame occurred. In this embodiment, the digital cuts are restricted to film frame boundaries ABCD while in the editing system and thus the cuts may only occur on A1, B1, B3 C2, or D2 fields in the output.

In this practice of the invention, the extended EDL is advantageously used to identify potential frame sequences that should be grouped together for downstream processing, such as color correction. Because of camera differences and lighting changes, the color of certain objects may not appear consistent between scenes, and thus a color correction is required. The extended EDL allows the color correction to be applied to all of the video fields that originated from the same scene on film. Furthermore, the extended EDL is compatible with legacy editing systems since the additional new information that identifies the pulldown and phase of the segment is included in a comment field, and will be ignored by systems that do not support the additional information.

Pulldown EDL

In a second embodiment of the invention, another form of an extended EDL, which is termed a "Pulldown EDL", is generated when the editing is performed on interlaced material, having for example 30 frames and 60 fields in each second of content. FIG. 7 depicts a pulldown EDL, according to the invention. All source material originated as 24 fps progressive film that was converted to a video format through a pulldown sequence prior to being brought into the editor. In this second embodiment of the invention, edits are not constrained to fall on film frame boundaries as in the first embodiment. However, the editor does constrain edits to occur at field 1 boundaries or in other words, video frame boundaries. For example, in contrast to the first embodiment, an edit point corresponds to a video frame boundary, and thus the phase indicator in a pulldown EDL is constrained to the A1, B1, B3, C2, or D2 fields, which are the first fields of any frame generated by the telecine process.

A pulldown EDL also differs from a conventional EDL by requiring that the timecodes identified in the EDL include a field indicator, which identifies the field sequence of the identified phase indicator. The time code is thus concatenated with either a "0.1" or "0.2", which specifies whether the identified field is the first or second field of the frame. Since all the edit points are constrained to video frame boundaries the field indicator must specify "0.1" indicating that the edit starts on the first field in the frame.

In this practice of the invention the pulldown EDL not only identifies the pulldown phase of the video segments identified in the EDL, but also the original source of the video material. The EDL includes for each time code segment, again within a comment field, whether the video content was originally recorded on film in the progressive mode and later converted to the video format or was recorded as native video. This information can be advantageously utilized by an encoder, as described later, to provide for more efficient and better quality compression techniques and thus reduce the amount of digital storage required while at the same time increasing the quality of the video upon decompression. The MPEG-2 compression standard, which is well known to those of ordinary skill in the art, is preferred as a compression technique, but the invention is not so limited and other compression techniques are contemplated to be within the scope of the invention.

Mixed Source EDL

In a third embodiment of the invention, the output composition is described by an extended EDL that consists of mixed sources as shown in FIG. 8. If one of the sources is film of varying frame rates, the film frames are converted to a video stream using the telecine process or other conversion process. Editing is done on the interlaced material at video frame boundaries as described for a Pulldown EDL. In one example, the output composition, therefore, consists of a combination of progressive source material converted to NTSC video by the telecine process and video originally recorder as NTSC video. For example, a Mixed Source EDL may identify both a 24 p source, converted to an NTSC video by a telecine process and edited as video, and a video source recorded in the NTSC format as comprising the output composition in combination. In another example, a Mixed Source EDL may identify a 24 p source, converted to a PAL video by a telecine process and edited as video, and a video source recorded in the PAL format as comprising the output composition in combination.

In this embodiment, the edit points for a Mixed Source EDL are confined to video frame boundaries, and thus the phase indicator for each identified timecode is constrained to the A1, B1, B3, C2, and D2 fields for both the converted progressive material and the interlaced material. A Mixed Source EDL also includes a field indicator for each identified timecode to identify the field sequence of the identified phase indicator. Since all the edit points are constrained to video frame boundaries the field indicator must specify "0.1" indicating that the edit starts on the first field in the frame.

In this practice of the invention the Mixed Source EDL not only identifies the pulldown phase of the video segments identified in the EDL, but also the original source of the video material. The EDL includes for each time code segment, again within a comment field, whether the video content was originally recorded on film in the progressive mode and later converted to the video format or was recorded as native video. This information can be advantageously utilized by an encoder, as described later, to provide for more efficient and better quality compression techniques and thus reduce the amount of digital storage required while at the same time increasing the quality of the video upon decompression. The MPEG-2 compression standard, which is well known to those of ordinary skill in the art, is preferred as a compression technique, but the invention is not so limited and other compression techniques are contemplated to be within the scope of the invention.

Mixed Editing EDL

In a fourth embodiment of the invention, all source material is 24 fps progressive and the editing is performed in either 24 p mode or as video after a conversion of the progressive material. Material that is edited in 24 p mode is then converted to video using the telecine process. Editing is not restricted to film frame boundaries. In order to maintain a proper pulldown cadence for the output video, the source timecodes and field indicators may require modification.

The "A" and "B" frames are the only frames in the pulldown phase that begin on field 1 of the new video frame boundary. In order to retain a continuos 2/3-pulldown relationship, field indicators will need to be added to the EDL to indicate field start and stop for a certain frame. There is a need to readjust the fields, in this embodiment of the invention, based on the fact that a field 1 edit cannot occur with a field 2 edit due to phase problems.

In FIG. 9, the timecodes that are underlined have been adjusted to show the beginning of the first field of the film frame, which is the image that was used in the edit. As is typical in most EDL's, the "out" point is exclusive. The record side demonstrates a continuous 2/3 pulldown from frame 1, in this case, an "A" frame. The source material has been adjusted to reflect the start at the first field of the original film frame. One needs to note that the color framing may be off due to the alignment of a field 1 source onto a field 2 record. This will not be allowed in an analog session, but can be achieved in a digital format.

It is necessary to further adjust the EDL so that a matching pulldown pattern is created from the source to the record. For example, in the above EDL, events 005 and 007 do not have matching 2/3-field sequencing. This does not mean the exact same phase of the pulldown (A, B, C, D), but at least the same number of fields from the pulldown sequence whereas "A" and "C" are two fields, and "B" and "D" are three fields and can be matched together as an edit. These adjustments must be done on the source side in order to maintain a continuous 2/3 pulldown sequencing on the, record. The same EDL of FIG. 9 has been further adjusted in FIG. 10 to match the 2/3 sequencing from source to record. These adjustments are indicated in bold.

Only the head of each edit needs to be adjusted since it is overwriting the last out. This is the natural behavior of EDL's where the "out" point of the previous is the "in" point of the next edit. The only time this adjustment is not possible is when the first frame of the record is a three-field (B or D) and the source is a two field (A or C). Any three-field frame can create a two-field sequence (disregarding color-framing issues) but a 2-field frame cannot create a 3-frame sequence unless within the digital environment, the deck can hold for 1 extra frame. The out point is adjusted to maintain the original duration of the edit.

The next pass of optimization would be to re-adjust the source edits (+/− 1 frame/field) to correct any areas where this 2-field source would match up with a 3 field record. This could be done as part of the original creation of the EDL when the first pass at the timing adjustments have been made, or it might have to be done in three passes as demonstrated here.

The minimum amount of extra information needed in the EDL is the field indicator. The program generating the EDL would be tracking the pulldown and this information is not needed in the case of an NTSC online where both the source and output composition are both video based. With some extra optimizations of the EDL, all other pulldown information and adjustments are known by the sequence.

Application of an Extended EDL to Optimize Downstream Compression

In each of the previously described embodiments of the invention, the source timing of the fields from the film or video sources, the pulldown sequence and phase, is conveyed through the post-production process. After the source timing is tracked through the postproduction system it can be conveyed to a compression engine (an encoder) to store the digital result more efficiently. The source timing information can be used by the compressor to optimize the visual quality of the bitstream when decoded and displayed on both interlaced and progressive displays. Carrying the source timing information through the postproduction process to the compressor enables better visual quality on either or both types of display.

In one embodiment of the invention, the source timing information is conveyed to the compressor via an extended EDL. This is a compact and easily interpreted way of conveying the source timing. One of ordinary skill in the art will recognize that other methods, such as extracting source timing from an OMF/AAF file may be possible and provide equivalent functionality. The extended EDL can be advantageously used to optimize the further compression of the video material. Knowledge of source timing is useful when trying to optimize the visual quality at the display, especially when displays can be either progressive or interlaced.

Source timing is especially important when the source is 24 fps and stored in a 60 field per second video stream. In that case a 2:3 pulldown is introduced by the telecine process. In 2:3 pulldown, film frames are alternatively converted into either 2 video fields or 3 video fields. In the case of editing video, the 2:3 cadence will usually be interrupted. By conveying the source timing to the encoder, it can 1) compress frames more efficiently by removing redundant fields introduced by the telecine
2) mark the progressive nature of the source in the bitstream so that the display device can display fields and frames at times which best match the timing of the display device to the timing of the source material.

MPEG-2 is one example of video coding that is used for DVDs, ATSC terrestrial broadcasting, satellite broadcasting and potentially for streaming video over networks. MPEG-2 video is used herein to illustrate how source timing information is used to optimize the visual quality of video on both progressive and interlace displays. One of ordinary skill in the art will recognize that other compression schemes may make similar use of the source timing information, but the details of the compression tools and syntax of the bitstream may differ.

The MPEG-2 video standard has several syntax elements that support conveying the source timing to the decoder and display. These are:

frame_rate_code—found in the Sequence Header progressive_sequence—found in the Sequence Extension frame_rate_extension_n—found in the Sequence Extension frame_rate_extension_d—found in the Sequence Extension progressive$_{13}$ frame—found in the Picture Coding Extension picture_structure—found in the Picture Coding Extension top_field_first—found in the Picture Coding Extension repeat_first_field—found in the Picture Coding Extension A recent Amendment to the MPEG-2 Video Standard, Proposed Draft Amendment ISO/IEC 13818-2.2/PDAM1, introduces the carrying of supplemental information in each coded picture. This information consists of a capture timecode, pan-scan parameters, an active region window, and a coded picture length. The capture timecode is a time stamp that indicates the origination time of the fields or frames encoded in a compressed picture. The extended EDL makes it possible to compute the values of capture timecode for each coded picture. Since we are given the timecode at the in point and the out point, all the information necessary to set the capture timecode values is available. If two fields originated in the same progressive frame then the capture timecode for the two fields will be the same. Two fields that originated as video (as indicated by the extended EDL) will have different capture timecode values.

The setting of progressive_sequence to 1 is permitted when all the source material is film based, the project has been edited entirely at 24 fps, and the intended encoded frame rate is 24 fps or 23.99 fps. Some MPEG-2 applications disallow material encoded at 24 fps. In which case, the material must be encoded with progressive_sequence=0 and frame_rate 25, 30, or 30000/1001. It is expected that as 30 progressive and 60 progressive material and editing systems capable of handling this material become available, the progressive sequence flag may be set to 1 for those sequences.

The value of frame_rate represents the nominal period between two successive fields or frames at the output of the decoding process. (When progressive_sequence is '1', fram_rate is rate of frames, when progressive_sequence is '0', it is the rate of fields.) The period can be modified during the display process (following decoding) based on the characteristics of the display. The display process is not standardized by the MPEG-2 standard. The frame_rate is set to match the desired default timing between successive fields or frames. The display processor may chose to deinterlace or reinterlace fields to better match the display timing to the source timing of the encoded signal.

An important consideration in encoding 2:3 material properly is that each source film frame (A, B, C, and D) is represented in the bitstream as a distinct encoded picture. In other words, source pictures B and D in the pattern are encoded as distinct pictures with progressive_frame='1' and repeat_first_field='1'. The following guidelines apply.

For sequences which have progressive_sequence set to '0', there are 3 syntax elements that must be set on a picture by picture basis: progressive_frame, picture_structure and repeat_first_field. The appropriate settings of these flags are given below:

1) Interlaced material that originated as video
   a) When encoded as two separate fields:
      i) picture_structure is '01' (top field) or '10' (bottom field)— in which case progressive_frame is required to be '0', repeat_first_field is required to be '0'
   b) When encoded as a frame:
      i) picture_structure is '11' (frame picture) and progressive_frame is '0' (non-progressive), repeat_first_field is required to be '0'
2) Interlaced material that originated as film (i.e. progressive)
   a) When encoding two successive fields that originated from the same film frame:
      i) picture_structure is '11' (frame picture) and progressive_frame is '1' (progressive), repeat_first_field is '0'.
   b) When encoding three successive fields that originated from the same film frame:
      i) picture_structure is '11' (frame picture) and progressive_frame is '1' (progressive), repeat_first_field is '1'.

There are three main cases to consider when mapping the EDL to MPEG-2 parameter settings:

Interlaced Source—Interlaced Edit

This is an instance of the first case in the above. The MPEG-2 flags, progressive_frame and repeat_first_field, should always be set to zero. The encoder may chose the picture_structure to optimize bit allocation.

Progressive Source—Progressive Edit

In this case, there is a continuous 2:3 cadence from start to finish. The sequence can be encoded with progressive_sequence='1' if the encoder can convert from the interlace to the progressive format (inverse telecine, inverse 2:3) and if a progressive sequence is supported by the application. The sequence can also be encoded with progressive_sequence='0'. In that case, progressive_frame should be set to 1 on every frame and the repeat_first_field flag set to '1' on every other frame. In other words, repeat_first_field should be set to '1' on each B and D frame and set to '0' on each A or C frame. The phase indicator in the extended Digital Cut EDL provides a method for identifying the start of the 2:3 cadence. From then on the repeat first_field flag can be toggled.

Progressive Source (Optionally Mixed with Interlaced Source)—Interlaced Edit

Here we discuss the case of 24 fps progressive source, potentially mixed with 30 frame per second interlaced video (hereafter 30 i video), edited as 30 i video. A 2:3 pulldown is used to convert the progressive source material to the interlaced material that is used in the editing session. In an interlaced editing session, the cuts are constrained to occur on video field 1. Field 1 video boundaries may fall on A1, B1, B3, C2 or D2. The resulting composition may contain cuts, which contain "dangling fields". These are single, unpaired fields which originate from a film frame. The other field has been edited out. The possible dangling fields are B3 and C2 on in points and C1 and D1 on out points. MPEG-2 encoding must pair groups of 2 or 3 fields together into "frames". MPEG-2 cannot encode an unpaired field.

The extended EDL helps in several ways. First, it identifies which material was film originated and may potentially use progressive_frame and repeat_first_field flags, separating Case 1 above from Case 2. By labeling the in points and out points of each clip with a phase indicator corresponding to its position in the 2:3 pulldown sequence, the MPEG-2 encoder can correctly identify which fields can be combined into progressive frames during the encoding process. There may still be certain cases where the MPEG-2 encoder must chose to encode some film frames with progressive_frame='0'. This occurs because of a dangling field. Two examples follow.

EXAMPLE 1

Dangling Field on an Out Point

A1 A2 B1 B2 B3 C1 | V0 V1 V2 V3 V4 V5

The above representation shows a cut from film originated material to video (interlaced source) material. The MPEG-2 encoder will encode the first two fields with progressive_frame='1', repeat_first_field='0'. Then it must decide whether to encode B1, B2 and B3 with progressive_frame='1' repeat_first_field='1'. This is the best encoding to preserve the progressive nature of the source. However, since MPEG-2 requires all fields to be paired into frames, this will not work, because it will require pairing the remaining fields as (C1, V0), (V1, V2), (V3, V4) and leave V5 unpaired. In this case the encoder must encode B1, B2 as a frame with progressive_frame='1', repeat_first_field='0' and B3, C1 as a frame with progressive_frame='0', repeat_first_field='0'.

EXAMPLE 2

Dangling Field on an in Point

V0 V1 V2 V3 V4 V5 | C2 D1 D2 D3 A1 A2

A similar situation may occur on an in point. The first field after a cut may be a single unpaired field in the 2:3 sequence. In this case the encoder would like to pair D1, D2, D3 into a progressive frame and A1 and A2 into a second progressive frame. However, this is not allowed because C2 would be unpaired. The encoder must encode (C2, D1) as one frame with progressive_frame='0', repeat_first_field='1', and (D2, D3) as another frame with progressive_frame='1' and repeat_first_field='0'.

In the general case of mixed video and film originated source material with 2:3 pulldown, making the encoding decisions of when to use progressive_frame requires the ability to look ahead and analyze the implications of future cuts. The extended EDL makes this possible. While there may still be some cases where progressive frames must be encoded as non-progressive, the extended EDL enables the MPEG-2 encoder to make the best possible decisions and preserve the progressive nature of frames which originated as progressive.

As shown in the examples above there are cases where progressive source frames must be encoded as non-progressive in order to achieve a legal MPEG-2 bitstream. When this occurs, the capture timecode is used as the method to convey the source timing through the MPEG-2 bitstream to the downstream devices, including the display. In example 1 above, the encoder must encode B1 B2 B3 C1 as two non-progressive frames. In this case the capture timecode associated with the two fields of the first frame and the first field of the second frame would be the same. The second field of the second frame (C1) would have a different capture timecode.

Aspect ratio in an extended EDL may also be advantageously used to set appropriate MPEG-2 compression parameters pertaining to pan-scan parameters, aspect ration, and the active region window.

Having described the invention, it should be apparent to those of ordinary skill in the art that the foregoing is illustrative and not limiting. Numerous modifications and other embodiments are within the scope of one of ordinary skill in the art and are contemplated as falling within the scope of the invention as defined by the appended claims.

We claim:

1. An editing system for editing a plurality of media materials to produce a media composition including interlaced frames having multiple fields, and identified by an edit decision list, the editing system comprising:

an editing machine for performing editing actions on one of said plurality of media materials in response to editing instructions corresponding to the editing actions;

an EDL generator for generating, in response to the editing actions, an edit decision list wherein the edit decision list includes a sequence of the interlaced frames corresponding to the media composition and a field relationship between the interlaced frames, wherein the field relationship represents an alternating cadence of video fields associated with each frame of the media composition.

2. The editing system of claim 1, wherein one of the plurality of media materials is a video data derived from and corresponding to film material.

3. The editing system of claim 1, wherein the alternating cadence in the field relationship includes alternating the number of fields for each frame.

4. The editing system of claim 1, wherein one of the plurality of media materials is video data derived from and corresponding to videotape.

5. An editing system for editing a plurality of media materials to produce a media composition including interlaced frames having multiple fields, and identified by an edit decision list, the editing system comprising:

an editing machine for performing editing actions on one of the plurality of media materials in response to editing instructions corresponding to the editing actions;

an EDL generator for generating, in response to the editing actions, an edit decision list, wherein the edit decision list includes a sequence of the interlaced frames corresponding to the media composition and a field relationship between the interlaced frames, wherein the EDL generator generates the edit decision list including metadata for communicating with a downstream processor, and wherein the metadata indicates which fields of the media composition are to be handled in a similar fashion by the downstream processor.

6. The editing system of claim 5, wherein the downstream processor performs color correction between the multiple fields.

7. The editing system of claim 5, wherein the downstream processor is a compression engine including a MPEG-2 encoder, and the downstream processor selects a compression strategy in response to the edit decision list.

8. The editing system of claim 7, wherein the compression strategy is responsive to whether the media material is progressive or interlaced material.

9. The editing system of claim 5, wherein the downstream processor is an on-line editing system.

10. The editing system of claim 5, wherein the downstream processor establishes audio synchronization with frame timing of the media material.

11. An editing system for editing a composition of motion video enabling an editor to specify segments of source material and to specify a sequence of the specified segments of source material, wherein each segment of source material is defined in an edit decision list by a reference to the source material and a portion of the source material using time codes, and wherein the sequence of the specified segments is defined in the edit decision list by a position in time for each segment using time codes, wherein each time code used in the edit decision list has an associated video field indicator and pulldown phase of the indicated video field, and wherein the associated video field indicator and an indicator of the pulldown phase are stored in the edit decision list.

12. The editing system of claim 11, wherein each segment further includes information about the source material.

13. The editing system of claim 12, wherein the information about the source material includes an indication of whether digitized images originating from the source are progressive or interlaced.

14. The editing system of claim 13, wherein the information about the source material includes an indication of the frame rate of images in the source material.

15. The editing system of claim 14, wherein the information about the source material includes an indication of the aspect ratio of images in the source material.

16. The editing system of claim 13, wherein the information about the source material includes an indication of the aspect ratio of images in the source material.

17. The editing system of claim 12, wherein the information about the source material includes an indication of the frame rate of digitized images originating from the source material.

18. The editing system of claim 17, wherein the information about the source material includes an indication of the aspect ratio of digitized images originating from the source material.

19. The editing system of claim 12, wherein the information about the source material includes an indication of the aspect ratio of digitized images originating from the source material.

20. The editing system of claim 11, wherein the time codes in the edit decision list represent time at a resolution of a video frame.

21. The editing system of claim 11, wherein the time codes in the edit decision list represent time at a resolution of a video field.

* * * * *